Feb. 23, 1932.   E. F. SAYLOR   1,846,361
HIGH VOLTAGE PLURAL CABLE CONDUCTOR
Filed Dec. 11, 1928
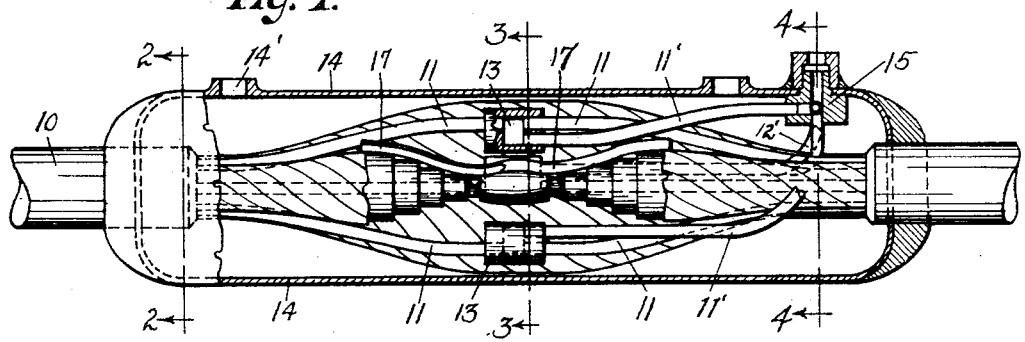
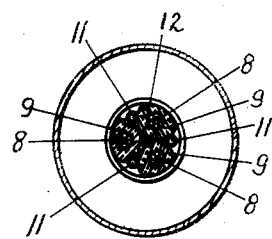
Fig. 2.
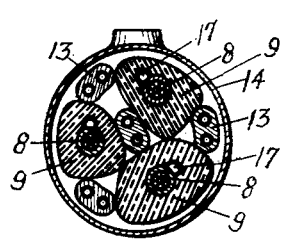
Fig. 3.
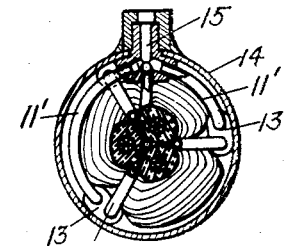
Fig. 4.
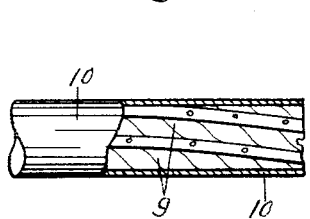
Fig. 5.
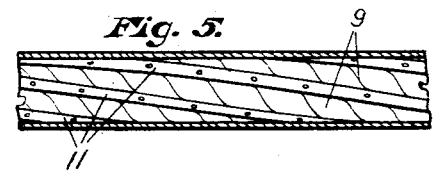
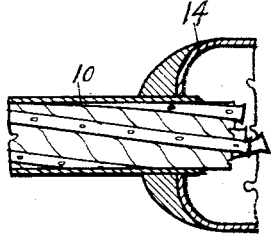
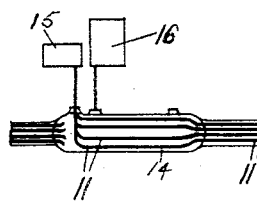
Fig. 6.
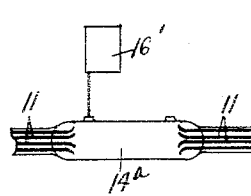
Fig. 7.
INVENTOR.
Ernest F. Saylor
BY
ATTORNEYS.

Patented Feb. 23, 1932

1,846,361

UNITED STATES PATENT OFFICE

ERNEST F. SAYLOR, OF LOS ANGELES, CALIFORNIA

HIGH VOLTAGE PLURAL CABLE CONDUCTOR

Application filed December 11, 1928. Serial No. 325,293.

My invention relates to high voltage plural cable conductors, and more particularly to the provision of means for supplying and circulating oil of great di-electric strength through the spaces between the strands of a cable, through the permeable insulating material covering the conductors, and filling all voids and air pockets which may have been left in the cable in the process of manufacture.

By my invention, I provide means for supplying oil to all parts of the cable to compensate for the effect of expansion and contraction of the oil and cable materials due to varying temperatures, caused by load conditions, or the effect of weather, and also preventing damage to the insulating materials which may occur due to porous lead casing, or other small leaks through the casing of the cable by maintaining oil under pressure therein.

It has been proven by experiment that air confined in a chamber with oil under pressure will be compressed into the oil in amounts depending on their volume and the pressure applied. The air being suspended in the oil will circulate with it, if pressure is maintained, and if the pressure is released, the air will be released from the oil, and form in pockets and thus lower the di-electric strength of the insulation.

My invention includes an improved three conductor cable encased in lead, though not limited to the number, designed to conduct high voltage electric current in three phase circuits underground. It differentiates from other lead covered cables in that I provide a plurality of small perforated tubes embedded in the insulating material which forms the filler between the insulated conductors and between the lead sheath and the conductors, parallel with the conductors, and through which oil is forced into said cable construction under pressure.

In order to explain my invention, I have illustrated the same on the accompanying sheet of drawings, which I will now describe.

Figure 1 is a longitudinal sectional view through the joint of a cable embodying my invention;

Figure 2 is a cross sectional view taken on line 2—2 of Fig. 1;

Figure 3 is a cross sectional view taken on line 3—3 of Fig. 1;

Figure 4 is a cross sectional view taken on line 4—4 of Fig. 1;

Figure 5 is a side elevation of a section of cable, with a portion of the outside covering removed in longitudinal section;

Figure 6 is a diagrammatic view showing one method of supplying oil under pressure to the cable and to the joints; and Figure 7 is a similar view showing another method of supplying oil under pressure to the cable and to the joints.

Referring in detail to the drawings, 8, 8, 8, designate three cable conductors and 9 designates the wrapping or insulation thereof, said cables being twisted together in the usual form, as indicated in Fig. 5, and provided with a lead sheath 10. Wound with and nestled in the space formed between the three insulated cables, I have placed small tubes, preferably of copper, perforated, as clearly indicated at 11, 11, and 12, the tube 12 being shown in the center of the combination conductor. These small tubes 11 and 12 are connected at their ends in a coupling member 13, in the cable joint 14, Fig. 1, with feed tubes 11' and 12' running from a filler block 15, in the joint case 14 to said coupling member 13, there being a coupling member interposed in each small tube within the cable joint 14, as will be clear from Fig. 1, and the feed tubes running from the filler block 15, in each case, to the coupling member 13 for each small tube. This makes it possible to force oil under pressure through the filler block 15 and the feed tubes 11' and 12' to the small coupling member 13 of each tube and in opposite directions in said small tubes 11 and 12, as will be clear from the drawings. The main joint case 14 is also provided with an inlet 14' for forcing oil into said joint case 14, and into all the spaces and interstices in and between the several tubes and cables in said joint and this supply can be at a different pressure, if desired, than the pressure used in forcing oil into the small perforated tubes extending from joint to joint.

In Fig. 6, I have shown a length of cable with two joints 14, 14, and have also shown two reservoirs for supplying oil to the cable. Reservoir 15, in each case connects with the small tubes at one end, the other ends of said tubes being sealed in the next joint case 14. Reservoir 16 connects with the joint case 14 for filling said joint case 14. Different pressures can be used in these reservoirs, as may be required for the best results in forcing oil into every possible space or place where air could get.

In Fig. 7, I have shown a similar connection, but have connected a reservoir 15' to the small tubes 11 and 12 in one joint, forcing the oil in both directions through said small tubes to the next joint case 14ª, where said tubes are closed at their ends. That is, reservoirs 15' are connected with alternate joints and each joint is provided with a reservoir 16' for the joint case 14ª.

Referring now to Fig. 1, I have provided a section of conduit, designated 17, being arch shape in cross section, as will be seen in Fig. 3. This conduit is placed at the joint and is wound in as the various layers are wound around the cable until it is covered, as shown in Fig. 3, with only its opposite ends protruding out above the outermost covering, said opposite ends being open and exposed, whereby oil under pressure in the joint case finds its way through this conduit member into the wrappings of the joint and fills every possible space. These conduit sections can be used where it is desired to force oil into the joint wrappings in the cable splice or joint, one of which is shown cut away, layer by layer in Fig. 1.

It will be obvious that changes in the details of connecting the reservoir or supply of oil under pressure with the small tubes can be made, as circumstances require, and I do not limit my invention to such details of connection, but provide the small perforated tubes through the cable combination in such manner that oil under pressure can be supplied to and maintained in the cable make up and the joints in such a way as to insure perfect insulation. The oil will be forced throughout the full length of the tubes and will pass out through the perforations, through the permeable insulating materials, into the spaces between the strands of the cable conductor, in both directions to the cable joints or splices, where it will pass into a receiving reservoir of known type which will act as a compression chamber to compensate for the action due to expansion and contraction of the cable materials. I limit my invention only by the hereto appended claims forming a part of this specification.

I claim:

1. In combination with a cable having plural conductors therein and cable joints, of means for supplying oil as an insulating means within said cable and comprising oil conductors in the valleys, said oil conductors having couplings in the cable joints, supply inlet means in the cable joints, and conduits connecting said inlet means with the couplings of said oil conductors within the cable joints, whereby oil can be forced in both directions from the couplings through the oil conductors from the cable joint.

2. In a cable having therein a plurality of conductors and joint members, of oil conduits for supplying oil as an insulating means within said cable, said oil conduits being perforated throughout their lengths to discharge oil in distributed locations, coupling members for said oil conduits, said coupling members being placed within said cable joint members, said joint members having means for supplying oil under pressure thereto, and conduits from said coupling members to the inlet for said cable joint whereby oil can be forced through said coupling members into said oil conduits within said cable.

3. In a cable having therein a plurality of conductors and joint members, of oil conduits placed in the valleys formed between said conductors in said cable, said conduits being perforated to discharge oil along their lengths, and coupling members connecting said oil conduits together within the joint members of said cable, said coupling members being adapted to receive oil and to direct it in both directions through the oil conduits connected therewith, and means for supplying oil under pressure to said cable joint members.

Signed at Los Angeles, Los Angeles County, California, this 5th day of December, 1928.

ERNEST F. SAYLOR.